Patented Nov. 28, 1950

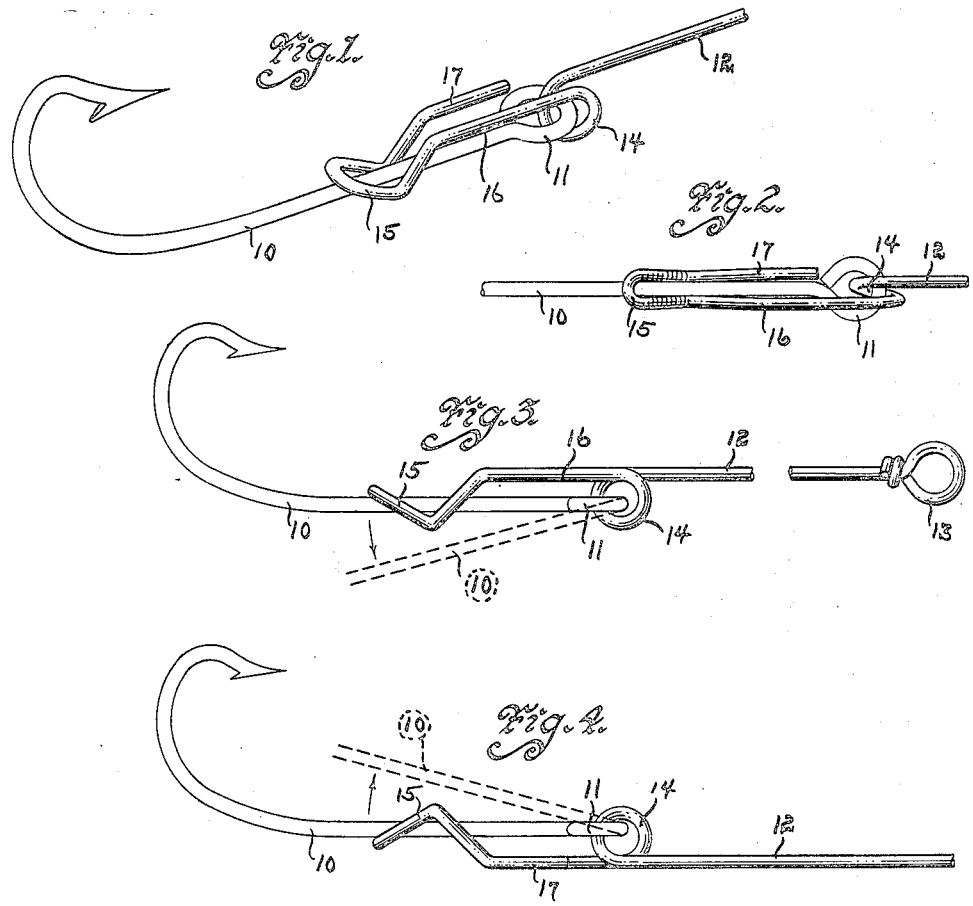

2,532,045

UNITED STATES PATENT OFFICE 2,532,045

FISHING GEAR

Michael E. Walsh, Des Moines, Iowa

Application June 19, 1946, Serial No. 677,679

2 Claims. (Cl. 43—43.1)

The principal object of this invention is to provide a leader to which hooks of various sizes may be easily and quickly attached or detached.

A further object of my invention is to provide a fish hook attaching means that is capable of yieldingly holding the hook in a rigid condition.

A still further object of my invention is to provide a novel leader that is so constructed as to permit adjustable tension for holding a fish hook or like in rigid relationship prior to the hooking of a fish.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a perspective view of my leader yieldingly holding a fish hook in rigid alignment thereto.

Fig. 2 is a top view of the rear portion of a fish hook and my leader more fully illustrating its construction.

Fig. 3 is a side view of my leader and fish hook with dotted lines showing how the fish hook may become flexible in its movement independent of the leader after a fish has been hooked.

Fig. 4 is a side view of my leader and fish hook with the hook capable of being moved upwardly and unsnapped from its rigid position on the leader.

Good fishermen require change of hooks and ready adjustment of fishing gear to meet their changing fishing conditions. In this respect the size and type of hooks and weed guards are most important. The usual method is to use a safety pin to detachably secure a hook to a line, but such pins are not satisfactory, do not permit any adjustment, nor hold the hook in rigid alignment. Furthermore, there is no successful way of securing a weed guard to a safety pin. I have overcome such objections as will hereinafter be understood and which I will now describe in detail.

The numeral 10 designates any type of fish hook having the usual eye 11. The numeral 12 designates, in general, my leader. The line end of this leader may be flexible, but for purposes of illustration, I show a leader of the non-flexible type, i. e., one made out of spring wire, piano wire, or similar strand material. The numeral 13 designates the usual eye of the leader for securing it to a line or like. Near the free end of this leader I bend the same to provide a loop formation 14, as shown in Fig. 1. From this loop the leader extends forwardly for a distance, then downwardly and forwardly, then is bent upwardly and forwardly in the form of a U-portion 15, then upwardly and rearwardly, and then directly rearwardly, as shown in Fig. 1. By this construction the forward end portion of the leader extends forwardly at various angles and then extends rearwardly to provide two spaced apart portions 16 and 17 which are connected by the U-portion 15. To place a fish hook on my leader it is merely necessary to feed the free end of the leader through the eye 11 of the hook, and pass the hook onto the length of the leader until the eye reaches the loop 14 of the leader, at which time the eye 11 is manually forced into the loop, as shown in Fig. 2. As the loop is closely wound it will have to be sprung slightly apart to permit this eye of the hook to pass into the loop, but once in the loop, the eye will be securely held therein and there is no danger of the hook becoming accidentally detached from the leader. To remove the hook it is a simple matter to force the eye of the hook out of the loop 14, after which the eye may pass from the free end of the leader. By this construction, rapid changes of various sizes and types of hooks may be easily and quickly accomplished. With the hook eye in the loop 14 the fish hook may swing freely in all directions relative to the leader. However, if it is desired that the hook be held in rigid alignment with the leader it is merely necessary to force the shaft of the hook between the portions 16 and 17 of the leader, as shown in Fig. 1, and the hook will be yieldingly held in such rigid relationship. However, once a fish has been hooked, the fish hook will be unsnapped from its yieldingly held position between the two portions 16 and 17 and the hook thereafter can freely swing in all directions on the loop 14, thereby preventing possible loss of the hooked fish and also permitting the easy removal of the hook from the fish after it has been netted. By this fastening portion of the leader extending forwardly and downwardly and then upwardly to form the U-portion 15, the guiding of the hook shaft between the portions 16 and 17 will be facilitated. The tension with which the hook will be yieldingly held in rigid relationship with the leader may be easily and quickly adjusted by bending the members 16 and 17 either closer together or farther apart. A rigid weight of the usual pattern may be placed on one side of the leader, thereby holding the hook upwardly or downwardly, as desired. Also, the hook can be threaded on from either side to give the two results shown in Fig. 3 and Fig. 4.

Some changes may be made in the construction and arrangement of my improved fishing gear without departing from the real spirit and purpose of my invention, and it is my intention to cover by my claims any modified forms of structure or use of mechanical equivalents which may be reasonably included within their scope.

I claim:

1. In a device of the class described, a leader having a line engaging eye, a loop formation for detachably receiving and holding the eye of a hook, and portions extending from said loop first forwardly and away from the line engaging eye of the leader, then downwardly and forwardly, then upwardly and forwardly in the form of a U-portion, then rearwardly and upwardly, and then rearwardly, whereby the said portions form a hook shaft engaging means.

2. In a device of the class described, a leader of spring wire material having a line engaging eye, a loop formation for detachably receiving and holding the eye of a hook, and portions extending from said loop first forwardly and away from the line engaging eye of the leader, then downwardly and forwardly, then upwardly and forwardly in the form of a U-portion, then rearwardly and upwardly, and then rearwardly, whereby the said portions form a hook shaft engaging means.

MICHAEL E. WALSH.

REFERENCES CITED

The following references are of record in the file of this patent:

UNITED STATES PATENTS

| Number | Name | Date |
|---|---|---|
| 863,078 | Merz | Aug. 13, 1907 |
| 1,766,279 | Brown | June 24, 1930 |
| 2,160,347 | Walsh | May 30, 1939 |
| 2,274,131 | Edberg | Feb. 24, 1942 |
| 2,331,215 | Mincenberg | Oct. 5, 1943 |